(12) United States Patent
Arakawa et al.

(10) Patent No.: US 12,059,928 B2
(45) Date of Patent: *Aug. 13, 2024

(54) PNEUMATIC TIRE

(71) Applicant: Toyo Tire Corporation, Itami (JP)

(72) Inventors: Sayaka Arakawa, Itami (JP); Shingo Kuwano, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,454

(22) Filed: Apr. 27, 2021

(65) Prior Publication Data

US 2021/0331524 A1  Oct. 28, 2021

(30) Foreign Application Priority Data

Apr. 28, 2020  (JP) ................ 2020-079778

(51) Int. Cl.
   *B60C 11/03*    (2006.01)
   *B60C 11/13*    (2006.01)
   *B60C 11/12*    (2006.01)

(52) U.S. Cl.
   CPC ........ *B60C 11/0302* (2013.01); *B60C 11/033* (2013.01); *B60C 11/0332* (2013.01);
   (Continued)

(58) Field of Classification Search
   CPC ... B60C 11/13; B60C 11/033; B60C 11/0302; B60C 2200/04; B60C 2011/0344;
   (Continued)

(56) References Cited

U.S. PATENT DOCUMENTS

D370,440 S  *  6/1996  Kuwazima ............... D12/550
5,885,384 A  *  3/1999  Himuro ............. B60C 11/0302
                                             152/209.18
(Continued)

FOREIGN PATENT DOCUMENTS

CN      1986203 A    6/2007
CN    104442215 A    3/2015
(Continued)

OTHER PUBLICATIONS

Machine Translation WO 2015008659.*
(Continued)

*Primary Examiner* — Justin R Fischer
*Assistant Examiner* — Wendy L Boss
(74) *Attorney, Agent, or Firm* — WHDA, LLP

(57) ABSTRACT

A pneumatic tire of the embodiment including two main grooves provided on a tread and extending in a tire circumferential direction; a center land portion formed between the two main grooves and extending in the tire circumferential direction; a pair of shoulder land portions formed between a ground contact end and the main groove; a center auxiliary groove provided on the center land portion; and a shoulder auxiliary groove provided on the shoulder land portion, in which the center auxiliary groove has a groove width narrower than that of the main groove and extends in the tire circumferential direction, and the shoulder auxiliary groove has a groove width narrower than that of the main groove and extends in the tire circumferential direction.

21 Claims, 5 Drawing Sheets

(52) U.S. Cl.
CPC ............... *B60C 11/13* (2013.01); *B60C 11/03* (2013.01); *B60C 2011/0339* (2013.01); *B60C 2011/0344* (2013.01); *B60C 2011/0348* (2013.01); *B60C 2011/0353* (2013.01); *B60C 2011/0355* (2013.01); *B60C 2011/0367* (2013.01); *B60C 2011/0381* (2013.01); *B60C 2011/0388* (2013.01); *B60C 11/1236* (2013.01)

(58) Field of Classification Search
CPC ..... B60C 2011/0365; B60C 2011/0388; B60C 2011/0348; B60C 2011/0395; B60C 2011/039; B60C 2011/0341; B60C 2011/0346; B60C 2011/0386
See application file for complete search history.

(56) References Cited

U.S. PATENT DOCUMENTS

| | | | |
|---|---|---|---|
| 5,974,872 A | 11/1999 | Morishira et al. | |
| 9,221,305 B2 * | 12/2015 | Washizuka | B60C 11/0311 |
| D934,783 S * | 11/2021 | Kuwano | D12/550 |
| 2007/0144641 A1 | 6/2007 | Nguyen et al. | |
| 2009/0114324 A1 * | 5/2009 | Ohki | B60C 11/13 |
| | | | 152/209.8 |
| 2009/0229721 A1 * | 9/2009 | Ikeda | B60C 11/033 |
| | | | 152/209.18 |
| 2010/0116392 A1 * | 5/2010 | Yamakawa | B60C 11/033 |
| | | | 152/209.15 |
| 2015/0020937 A1 * | 1/2015 | Nakamura | B60C 11/042 |
| | | | 152/209.8 |
| 2015/0231928 A1 * | 8/2015 | Sato | B60C 11/1259 |
| | | | 152/209.18 |
| 2017/0144488 A1 * | 5/2017 | Tanaka | B60C 11/0306 |
| 2019/0176527 A1 * | 6/2019 | Yasunaga | B60C 11/0302 |
| 2021/0008929 A1 * | 1/2021 | Özüduru | B60C 11/1323 |

FOREIGN PATENT DOCUMENTS

| | | | | |
|---|---|---|---|---|
| EP | 2537688 A2 * | 12/2012 | ......... | B60C 11/0306 |
| JP | H03-128705 A | 5/1991 | | |
| JP | 2001-018617 A | 1/2001 | | |
| JP | 2005-306155 A | 11/2005 | | |
| WO | 97/014946 A1 | 4/1997 | | |
| WO | WO-2015008659 A1 * | 1/2015 | ......... | B60C 11/0304 |
| WO | 2015/193805 A1 | 12/2015 | | |

OTHER PUBLICATIONS

Office Action dated Oct. 10, 2022, issued in counterpart CN application No. 202110392782.8, with English translation. (14 pages).

Office Action dated Mar. 24, 2023, issued in counterpart CN application No. 202110392782.8, with English translation. (16 pages).

Office Action dated Dec. 19, 2023 issued in counterpart JP application No. 2020-079778, with English translation. (6 pages).

Office Action dated Apr. 22, 2024, issued in counterpart JP application No. 2020-079778, with English translation. (8 pages).

* cited by examiner

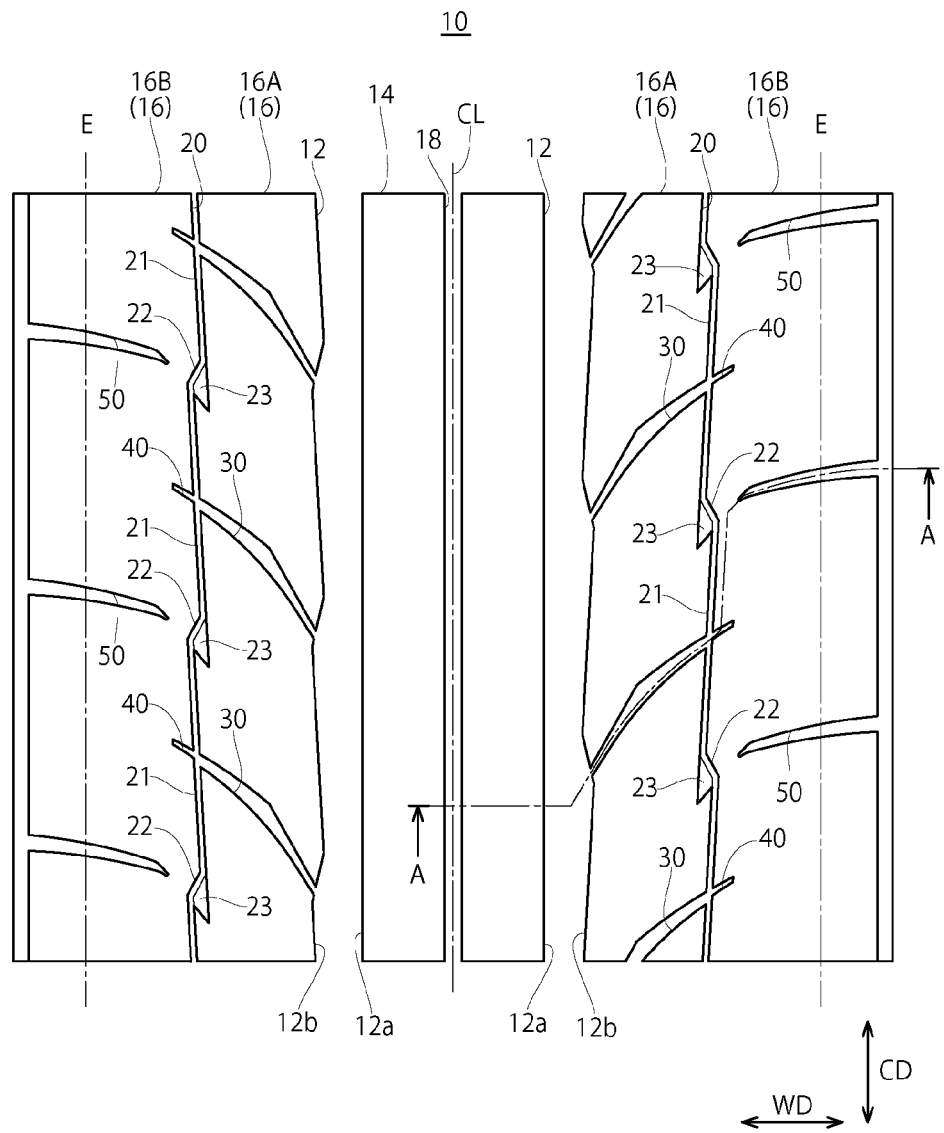
[Fig. 1]

[Fig. 2]
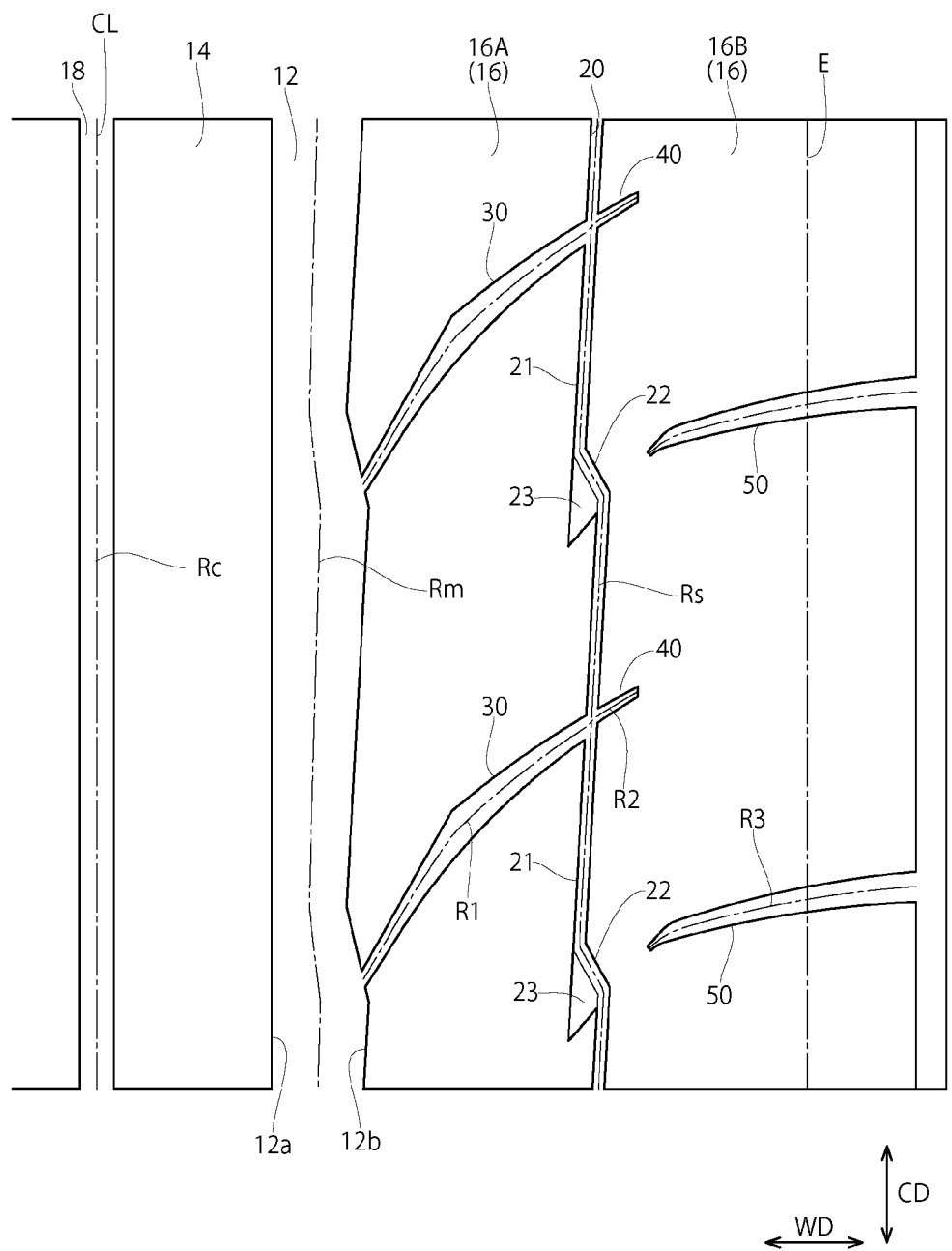

[Fig. 3]
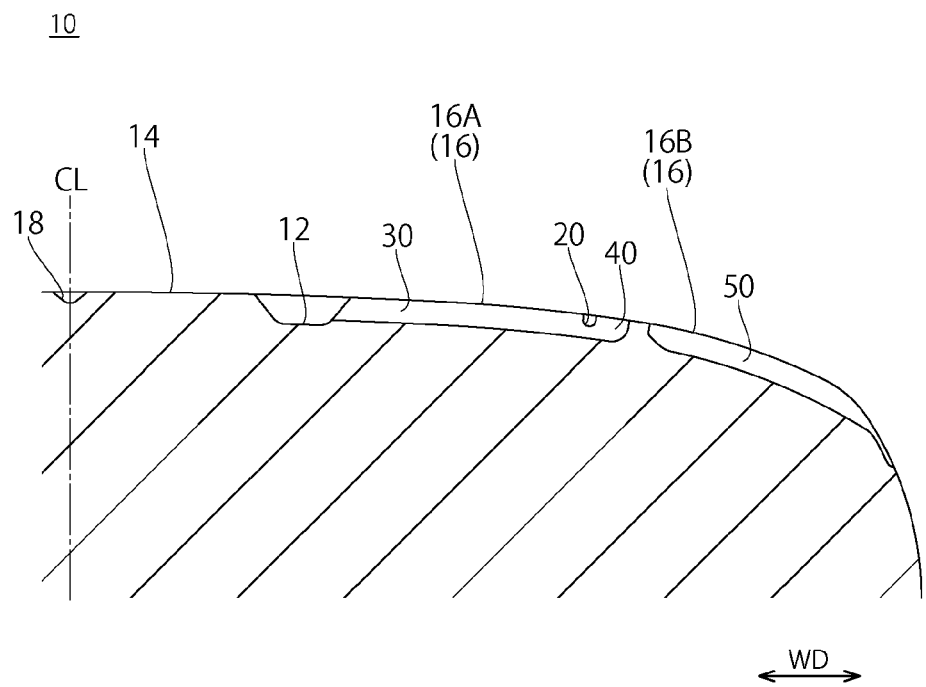

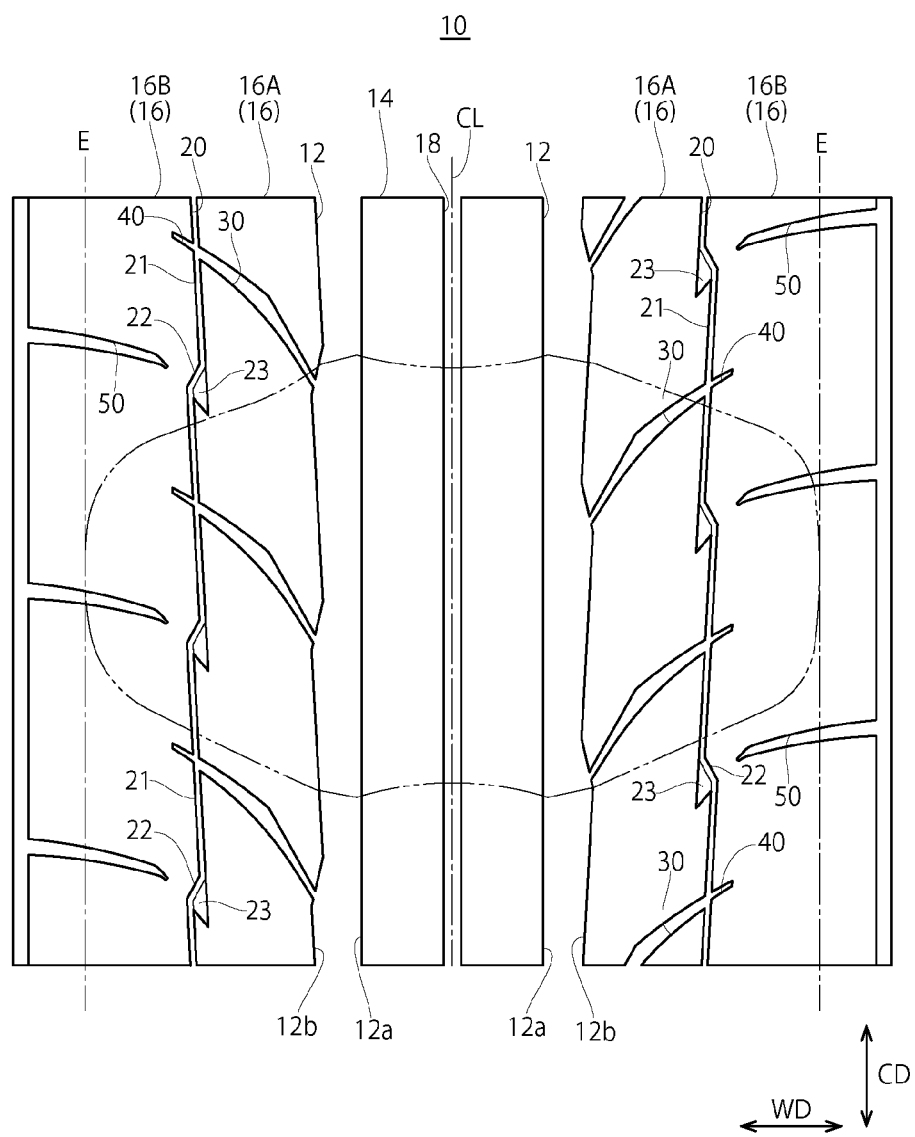
[Fig. 4]

[Fig. 5]
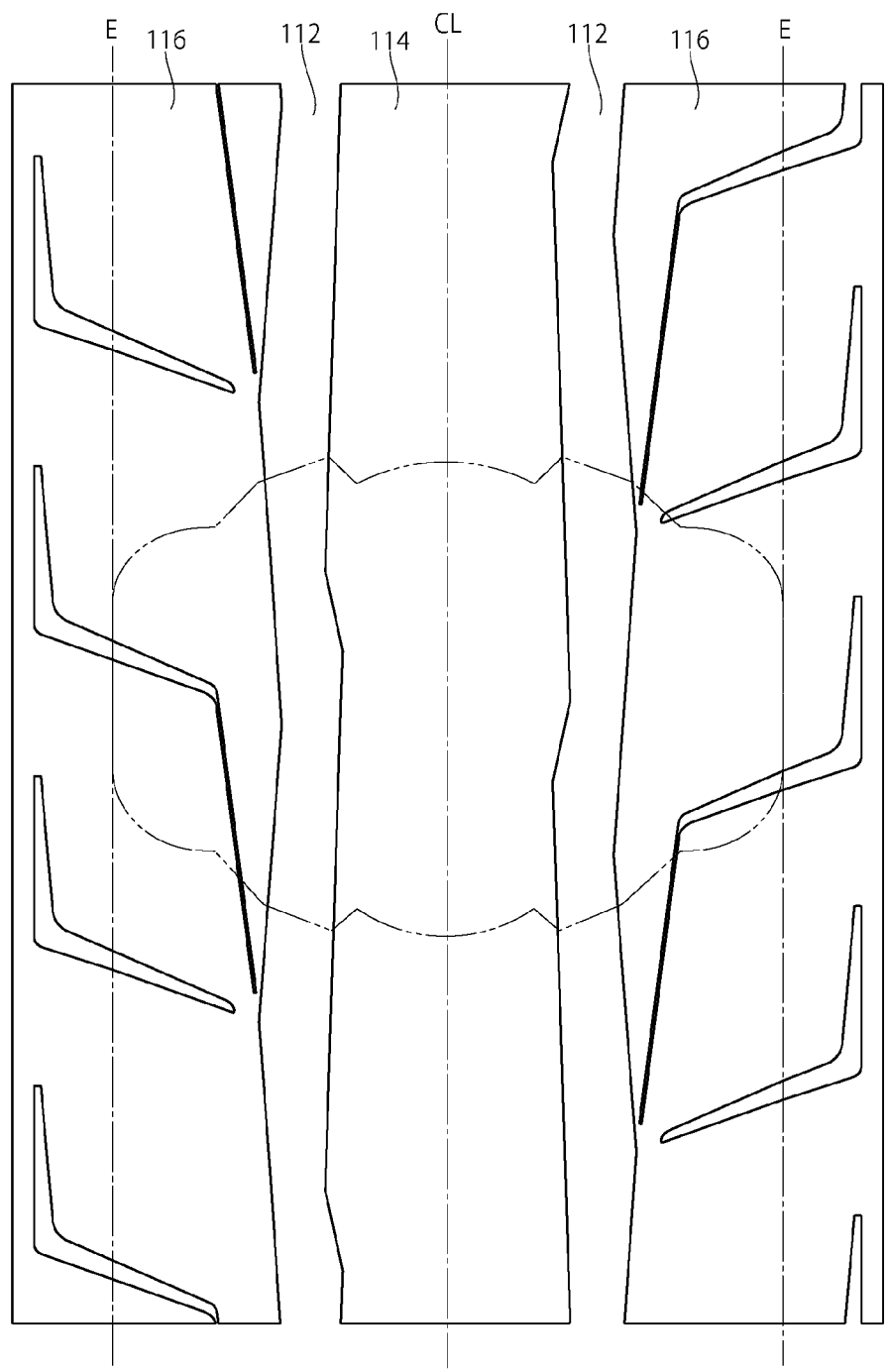

PNEUMATIC TIRE

BACKGROUND OF THE INVENTION

Field of the Invention

The present invention relates to a pneumatic tire.

Background Art

A pneumatic tire used in a competition such as a drag race may reduce a proportion of an area of a groove portion in a tread, called a void ratio, in order to expand a ground contact area and obtain high grip and traction.

Such a pneumatic tire may set a tire internal pressure low in order to expand a ground contact area when used in the competition (for example, refer to JP-A-2005-306155).

SUMMARY OF THE INVENTION

However, when a tire internal pressure is set low in a pneumatic tire having a small void ratio, there is a possibility that a portion where is unlikely to ground locally in a tire width direction is likely to occur, and a sufficient ground contact area may not be obtained.

In view of such circumstances, it is an object of the present invention to provide a pneumatic tire capable of expanding the ground contact area even when the tire internal pressure is set low.

A pneumatic tire according to one embodiment of the present invention including two main grooves provided on a tread and extending in a tire circumferential direction; a center land portion formed between the two main grooves and extending in the tire circumferential direction; a pair of shoulder land portions separated by the main groove and positioned outside of the main groove in a tire width direction, the shoulder land portions extending in the tire circumferential direction; a center auxiliary groove provided on the center land portion and extending in the tire circumferential direction; and a shoulder auxiliary groove provided on the shoulder land portion and extending in the tire circumferential direction, wherein the center auxiliary groove has a groove width narrower than that of the main groove, and the shoulder auxiliary groove has a groove width narrower than that of the main groove.

A pneumatic tire according to another embodiment of the present invention including a tread section has a plurality of land portions defined by two main grooves extending in the tire circumferential direction; the plurality of the land portions includes a center land portion defined by the two main grooves extending in the tire circumferential direction and includes at least one of center auxiliary grooves extending in the tire circumferential direction; a shoulder land portion positioned outside of the main groove in a tire width direction and includes at least one of shoulder auxiliary grooves extending in the tire circumferential direction; wherein a width of the center auxiliary groove is narrower than that of the main groove, and a width of the shoulder auxiliary groove is narrower than that of the main groove.

BRIEF DESCRIPTION OF THE DRAWINGS

FIG. 1 is a diagram illustrating a tread pattern of a pneumatic tire according to an embodiment of the present invention.

FIG. 2 is an enlarged view of a main part of FIG. 1.

FIG. 3 is a cross-sectional view taken along line A-A of FIG. 1.

FIG. 4 is a diagram illustrating the tread pattern and a ground contact shape of the pneumatic tire according the embodiment of the present invention.

FIG. 5 is a diagram illustrating a tread pattern and a ground contact shape of a pneumatic tire according to a comparative example.

DETAILED DESCRIPTION OF THE INVENTION

Hereinafter, embodiments will be described with reference to the drawings.

A pneumatic tire according to the present embodiment (hereinafter, may be simply referred to as a tire) is provided with a pair of left and right beads and sidewalls and a tread provided between both sidewalls so as to connect radial outer ends portion of the left and right sidewalls, and a general tire structure can be adopted except for a tread pattern.

As illustrated in FIG. 1, two main grooves 12 extending in a tire circumferential direction CD are provided on a tread surface of a tread 10 at intervals in a tire width direction WD with a tire equatorial plane CL interposed therebetween.

The main groove 12 is a thick groove extending in the tire circumferential direction, and the main groove includes not only a straight shape but also a zigzag shape. The main groove 12 preferably has a groove width of 10 mm or more and a groove depth of 3 mm or more. In the present embodiment, the groove width is set to 14 mm and the groove depth is set to 5 mm.

In the present specification, the groove width is an interval between the opening ends (outer ends in a tire radial direction) interposing the groove, and in the case of a zigzag groove, is a groove width at the narrowest groove width.

In the present embodiment, as illustrated in FIG. 2, the main groove 12 extends along the tire circumferential direction CD without a groove wall 12a on the inner side in the tire width direction bending in a zigzag shape, and a groove wall 12b on the outer side in the tire width direction extends in the tire circumferential direction while bending in the tire width direction WD. As a result, a groove center line Rm passing through the groove width center of the main groove 12 (center in the width direction at each position in the length direction of the main groove) also extends in the tire circumferential direction while bending in the tire width direction WD.

The tread 10 is provided with a center land portion 14 interposed between two main grooves 12 and a pair of left and right shoulder land portions 16 formed between the main groove 12 and a ground contact end E.

The ground contact end E is the outermost position in the tire width direction WD on a ground contact surface. The ground contact surface refers to a surface of the tread that grounds the road surface when the tire is assembled on a regular rim, the tire is placed vertically on a flat road surface with an internal pressure of 140 kPa, and a load of 88% of the load corresponding to the load index is applied.

As illustrated in FIGS. 1 to 3, the center land portion 14 is provided with a center auxiliary groove 18 having a groove width narrower and a groove depth shallower than those of the main groove 12 and extending in the tire circumferential direction CD. The center auxiliary groove 18 preferably has a groove width of 50% or less of that of the main groove 12 and a groove depth of 60% or less of that of the main groove 12, and in the present embodiment, the groove width is formed to be 3 mm and the groove depth is formed to be 2 mm.

In the tire according to the present embodiment, the center auxiliary groove 18 has a straight shape extending parallel to the tire circumferential direction CD. As a result, in the tire according to the present embodiment, an angle of the groove center line Rm of the main groove 12 with respect to the tire circumferential direction CD is larger than an angle of a groove center line Rc passing through the groove width center of the center auxiliary groove 18 with respect to the tire circumferential direction CD at the position facing the tire width direction WD.

It is preferable that the center auxiliary groove 18 is provided so as to coincide with the tire equatorial plane CL so as to bisect the center land portion 14 in the tire width direction WD. That is, it is preferable that the center auxiliary groove 18 is provided on the center land portion 14 so that the groove center line Rc of the center auxiliary groove 18 coincides with the tire equatorial plane CL.

In addition, in the tire according to the present embodiment, as illustrated in FIG. 1, a groove intersecting with the center auxiliary groove 18 does not exist in the center land portion 14, and the center land portion 14 includes a rib-shaped land portion continuous in the tire circumferential direction CD.

As illustrated in FIGS. 1 to 3, the pair of shoulder land portions 16 are provided with shoulder auxiliary grooves 20 and 20 having a groove width narrower and a groove depth shallower than those of the main groove 12 and extending in the tire circumferential direction CD. The shoulder auxiliary groove 20 preferably has a groove width of 50% or less of that of the main groove 12 and a groove depth of 60% or less of that of the main groove 12, and in the present embodiment, the groove width is formed to be 3 mm and the groove depth is formed to be 2 mm.

The shoulder land portion 16 is divided into an inner shoulder land portion 16A and an outer shoulder land portion 16B by the shoulder auxiliary groove 20.

In the tire according to the present embodiment, the shoulder auxiliary groove 20 can be provided at any position of the shoulder land portion 16, and it is preferable that the shoulder auxiliary groove 20 is provided on the ground contact end side from the center of the shoulder land portion 16 in the width direction. That is, it is preferable that the shoulder auxiliary groove 20 is positioned between a ground contact edge E and a center of the shoulder land portion 16 in the tire width direction WD. In other words, it is preferable to provide the shoulder auxiliary groove 20 so that the area of the inner shoulder land portion 16A is larger than the area of the outer shoulder land portion 16B. For example, it is preferable to provide the shoulder auxiliary groove 20 so that the area of the inner shoulder land portion 16A is 1.1 to 1.6 times that of the outer shoulder land portion 16B.

It is preferable that the shoulder auxiliary groove 20 is a groove that is formed of a first groove portion 21 inclined and extending in the tire circumferential direction CD, and a second groove portion 22 inclined and extending in a direction opposite to the first groove portion 21 in the tire circumferential direction CD and is shorter than the first groove portion 21, and extends in a zigzag shape in the tire circumferential direction CD.

It is preferable that at least a portion of the first groove portion 21 and the second groove portion 22 is inclined in the same direction as the groove wall 12b of the main groove 12 facing in the tire width direction WD in the tire circumferential direction. More preferably, the first groove portion 21 and the second groove portion 22 extend parallel to the groove wall 12b of the main groove 12 facing in the tire width direction WD.

In the tire according to the present embodiment, it is preferable that the angle of the groove center line Rs passing through the groove width center of the shoulder auxiliary groove 20 with respect to the tire circumferential direction CD is larger than the angle of the groove center line Rm of the main groove 12 with respect to the tire circumferential direction CD at the position facing the tire width direction WD.

It is preferable that the shoulder auxiliary grooves 20 and 20 are provided with dimples 23 inside the second groove portion 22 in the tire width direction. The dimple 23 is a recess whose depth is equal to or less than the groove depth of the second groove portion 22, and is formed so as to extend inward in the tire width direction from the second groove portion 22 and widen the groove width of the second groove portion 22. Although the depth of the dimple 23 is not particularly limited, the depth of the dimple 23 is preferably 50% to 100% of the depth of the second groove portion 22, for example, and is formed to be 2 mm in the present embodiment.

As illustrated in FIGS. 1 and 2, it is preferable that the shoulder land portion 16 is provided with a plurality of lateral grooves 30, 40, and 50 extending in the tire width direction WD at intervals in the tire circumferential direction CD.

In the tire according to the present embodiment, a plurality of first lateral grooves 30 extending in the tire width direction WD are provided on the inner shoulder land portion 16A provided inside the shoulder auxiliary groove 20 in the tire width direction at intervals in the tire circumferential direction CD. The first lateral groove 30 is provided so as to cross the inner shoulder land portion 16A so as to connect the main groove 12 and the shoulder auxiliary groove 20. The angle of the first lateral groove 30 with respect to the tire circumferential direction CD is increased so that the groove center line R1 passing through the groove width center approaches the tire width direction WD as it goes outward in the tire width direction.

Although the groove width and groove depth of the first lateral groove 30 are not particularly limited, for example, the groove width is preferably 30% to 50% of the main groove 12, and the groove depth is preferably 50% to 100% of the main groove 12. In the embodiment, the groove width is formed to be 5 mm and the groove depth is formed to be 4 mm.

In addition, in the tire according to the present embodiment, a plurality of second lateral grooves 40 and a plurality of third lateral grooves 50 extending in the tire width direction WD are provided on the outer shoulder land portion 16B provided outside the shoulder auxiliary groove 20 in the tire width direction at intervals in the tire circumferential direction CD. The second lateral groove 40 and the third lateral groove 50 are alternately arranged in the tire circumferential direction CD.

The second lateral groove 40 extends outward in the tire width direction from the shoulder auxiliary groove 20 and terminates in the outer shoulder land portion 16B without reaching the ground contact end E. The groove center line R2 passing through the groove width center of the second lateral groove 40 has a larger angle with respect to the tire circumferential direction CD than the groove center line R1 of the first lateral groove 30. The groove center line R2 of the second lateral groove 40 has a larger angle with respect to the tire circumferential direction CD so as to approach the tire width direction WD toward the outside in the tire width direction.

The second lateral groove 40 may be provided so as to face the first lateral groove 30 provided on the inner shoulder land portion 16A with the shoulder auxiliary groove 20 interposed therebetween.

Although the groove width and groove depth of the second lateral groove 40 are not particularly limited, for example, the groove width is preferably 30% to 50% of the main groove 12, and the groove depth is preferably 30% to 50% of the main groove 12.

The third lateral groove 50 extends from the ground contact end E toward the shoulder auxiliary groove 20 in the tire width direction WD and terminates in the outer shoulder land portion 16B without communicating with the shoulder auxiliary groove 20. The groove center line R3 passing through the groove width center of the third lateral groove 50 has a larger angle with respect to the tire circumferential direction CD than the groove center line R1 of the first lateral groove 30 and the groove center line R2 of the second lateral groove 40. The groove center line R3 of the third lateral groove 50 has a larger angle with respect to the tire circumferential direction CD so as to approach the tire width direction WD toward the outside in the tire width direction.

The inner end portion of the third lateral groove 50 in the tire width direction may be provided so as to face the second groove portion 22 of the shoulder auxiliary groove 20 in the tire width direction WD. In addition, in the third lateral groove 50, the inner end portion of the third lateral groove 50 in the tire width direction may be located outside in the tire width direction from the outer end portion of the second lateral groove 40 in the tire width direction so as not to overlap the second lateral groove 40 in the tire width direction WD.

Although the groove width and groove depth of the third lateral groove 50 are not particularly limited, for example, the groove width is preferably 30% to 50% of the main groove 12, and the groove depth is preferably 50% to 100% of the main groove 12.

In the tire according to the present embodiment, the main groove 12, the shoulder auxiliary groove 20, the first lateral groove 30, the second lateral groove 40, and the third lateral groove 50 provided on the tread 10 are displaced by a predetermined distance from the tire circumferential direction CD on both sides of the tire equatorial plane CL, and each of the grooves 12, 18, 20, 30, 40, and 50 and the land portions formed by these grooves have a shape symmetrical with respect to the tire equatorial plane CL.

In the tread 10, assuming that the areas of the center land portion 14 and the shoulder land portion 16 within the ground contact width (that is, between the left and right ground contact ends E) are Ac and As, respectively, it is preferable that the area ratio (Ac/(Ac+2As)) of the center land portion 14 to the total area (Ac+2As) of the center land portion 14 and the pair of shoulder land portions 16 within the ground contact width is set to 30% to 35%, and the area ratio (As/(Ac+2As)) of the shoulder land portion 16 to the total area (Ac+2As) is set to 30% to 35%. In the present embodiment, the area ratio (Ac/(Ac+2As)) of the center land portion 14 is set to 31%, and the area ratio (As/(As+2As)) of the pair of shoulder land portions 16 is set to 34%, respectively.

In addition, the total opening area of the main groove 12, the center auxiliary groove 18, the shoulder auxiliary groove 20, the dimple 23, the first lateral groove 30, the second lateral groove 40, and the third lateral groove 50 provided on the tread 10 is preferably 25% or less of the area inside the ground contact width (that is, between the left and right ground contact ends E).

In addition, the tread rubber constituting the tread 10 is not particularly limited, and any tread rubber can be adopted. As an example, it is preferable to use a tread rubber having a tan δ at 0° C. of 0.933 and a difference between the tan δ at 30° C. and the tan δ at 60° C. of 0.13 to 0.17.

The tan δ at 0° C., 30° C., and 60° C. is a value measured under the conditions of stretch deformation distortion rate of 10%±2% and frequency of 20 Hz at each temperature of 0° C., 30° C., and 60° C. using a viscoelastic spectrometer (manufactured by Toyo Seiki Seisaku-sho, Ltd.) according to K6394-2007.

In the tire according to the present embodiment as described above, the center land portion 14 and the shoulder land portion 16 formed by two main grooves 12 extending in the tire circumferential direction CD are provided with auxiliary grooves 18 and 20 having groove widths narrower than that of the main groove 12 and extending in the tire circumferential direction CD, respectively. Therefore, while suppressing the decrease in rigidity of each of the land portions 14 and 16, the length of the ground contact portion in the tire circumferential direction (ground contact length) can be made uniform in the tire width direction WD, and the ground contact area can be expanded while obtaining a high ground contact pressure.

In the tire according to the present embodiment, since the center land portion 14 is a rib-shaped land portion that is continuous in the tire circumferential direction without a lateral groove, and the shoulder land portion 16 is provided with a plurality of lateral grooves 30, 40, and 50 at intervals in the tire circumferential direction, the shoulder land portion 16 can be likely to be grounded, and the ground contact length can be made uniform in the tire width direction WD.

In the tire according to the present embodiment, the angle of the groove center line Rm of the main groove 12 with respect to the tire circumferential direction CD is larger than the angle of the groove center line Rc of the center auxiliary groove 18. In addition, the angle of the groove center line Rs of the shoulder auxiliary groove 20 with respect to the tire circumferential direction CD is larger than the angle of the groove center line Rm of the main groove 12. That is, in the tire according to the present embodiment, the inclination angle with respect to the tire circumferential direction CD is larger by the grooves 12, 18, and 20 provided on the position close to the ground contact end E and extending in the tire circumferential direction CD. As a result, the land portions 14 and 16 provided on the tread 10 are likely to be affected by the grooves 12, 18, and 20 toward the ground contact end E, the ground contact length is longer in the outer portion in the tire width direction where the ground contact length is likely to be shorter than that of the central portion in the tire width direction, and the ground contact length can be made uniform in the tire width direction WD.

In the tire according to the present embodiment, since the angle of the groove center lines of the lateral grooves 30, 40, and 50 provided on the shoulder land portion 16 is larger toward the outside in the tire width direction, as the shoulder land portion 16 approaches the ground contact end E, it is likely to be affected by the lateral grooves 30, 40, and 50, the ground contact length is unlikely to be shortened in the vicinity of the ground contact end, the ground contact length at the shoulder land portion 16 can be made uniform.

In the tire according to the present embodiment, since the shoulder auxiliary groove 20 is provided on the ground contact end side from the center of the shoulder land portion 16 in the width direction, a region having a short ground contact length is unlikely to occur locally in the vicinity of the central portion of the shoulder land portion 16 in the width direction, and the ground contact length in the tire width direction WD can be made uniform.

In the tire according to the present embodiment, by setting the area ratio (Ac/(Ac+As)) of the center land portion 14 to the total area (Ac+2As) of the center land portion 14 and the pair of shoulder land portions 16 within the ground contact width to 30% to 35%, the area ratio (As/(Ac+2As)) of one shoulder land portion 16 to the total area (Ac+2As) to 30% to 35%, and reducing the area difference between the center land portion 14 and the shoulder land portion 16, the ground contact pressure can be made uniform.

In the tire according to the present embodiment, by providing the dimple 23 in the shoulder auxiliary groove 20, the surface area of the tread 10 is expanded and the heat exhaust performance can be ensured.

The tire according to the present embodiment can be applied to various tires such as a passenger car tire and a heavy load tire, and is preferably used for a competition vehicle tire such as a drag race.

The above embodiments are examples, and the scope of the invention is not limited thereto. Various omissions, substitutions, and changes can be made to the above embodiment without departing from the gist of the invention. The above embodiment and modification thereof are included in the inventions described in the aspects and the equivalent scope thereof.

EXAMPLE

In order to illustrate the effect of the above embodiment, pneumatic tires (size: 315/40R18) of an example and a comparative example were prepared on trial. Each of the prototype tires according to the example and the comparative example has the same tire structure except for the tread pattern.

The tire according to the example is the tire according to the above embodiment, and has the tread illustrated in FIGS. 1 and 4.

The tire of the comparative example has a tread as illustrated in FIG. 5. That is, in the tread 100 of the tire according to the comparative example, two main grooves 112 extending in the tire circumferential direction CD are provided with the tire equatorial plane CL interposed therebetween, a center land portion 114 is formed between the main grooves 112, and a pair of left and right shoulder land portions 116 and 116 formed between the main groove 112 and the ground contact end E are formed. The center land portion 114 and the shoulder land portion 116 are not provided with an auxiliary groove extending in the tire circumferential direction.

In addition, in the tire of the comparative example, assuming that the areas of the center land portion 114 and the shoulder land portion 116 within the ground contact width (that is, between the left and right ground contact ends E) are Bc and Bs, respectively, the area ratio (Bc/(Bc+2Bs)) of the center land portion 114 to the total area (Bc+2Bs) of the center land portion 114 and the pair of shoulder land portions 116 within the ground contact width is set to 43%, and the area ratio (Bs/(Bc+2Bs)) of one shoulder land portion 116 to the total area (Bc+2Bs) is set to 29%.

For each of the prototype tires according to the example and comparative example, the ground contact shape of the tread that grounds the road surface when the tire is assembled on a regular rim, the tire is placed vertically on a flat road surface with an internal pressure of 140 kPa, and a load of 88% of the load corresponding to the load index is applied, the average value of the ground contact pressure of the center land portion at this time, and the average value of the ground contact pressure of the shoulder land portion were measured.

As illustrated by the two-dot chain line in FIG. 5, in the ground contact shape of the tire according to the comparative example, a region having a short ground contact length was locally generated in the vicinity of the main groove 112 of the center land portion 114 and the vicinity of the central portion of the shoulder land portion 116 in the width direction, and a bias in the ground contact length in the tire width direction WD occurred. In addition, the average value of the ground contact pressure of the center land portion 114 was 14 N/cm$^2$, the average value of the ground contact pressure of the shoulder land portion 116 was 22 N/cm$^2$, and a bias in the ground contact pressure occurred between the center land portion 114 and the shoulder land portion 116.

As illustrated by the two-dot chain line in FIG. 4, in the ground contact shape of the tire according to the example, a region having a short ground contact length was not locally generated in the vicinity of the main groove 12 of the center land portion 14 and the vicinity of the central portion of the shoulder land portion 16 in the width direction, the ground contact length in the tire width direction WD could be made uniform, and the ground contact area could be expanded. In addition, the average value of the ground contact pressures of the center land portion 14 and the shoulder land portion 16 was 24 N/cm$^2$, and it was possible to uniform the ground contact pressure between the land portions while obtaining a high ground contact pressure.

What is claimed is:

1. A pneumatic tire comprising:
   two main grooves provided on a tread and extending in a tire circumferential direction;
   a center land portion partitioned by the two main grooves and continuously extending in the tire circumferential direction;
   a pair of shoulder land portions positioned outside of the two main grooves in a tire width direction, the shoulder land portions extending in the tire circumferential direction;
   a center auxiliary groove provided on the center land portion and extending in the tire circumferential direction; and
   a shoulder auxiliary groove provided on at least one shoulder land portion and extending continuously in the tire circumferential direction, wherein
   the center auxiliary groove is narrower than any of the two main grooves and shallower than any of the two main grooves, and
   the shoulder auxiliary groove is narrower than any of the two main grooves and shallower than any of the two main grooves, wherein
   the shoulder auxiliary groove has a first groove portion inclined and extending in the tire circumferential direction and a second groove portion inclined and extending in a direction opposite to the first groove portion in the tire circumferential direction and is shorter than the first groove portion, and
   the shoulder auxiliary groove portion has a zigzag shape formed by alternately connecting the first groove portion and the second groove portion,
   the center land portion includes a rib-shaped land portion continuous in the tire circumferential direction, the pair of shoulder land portions includes a plurality of lateral grooves provided at intervals in the tire circumferential direction and having one end connected with one of the main grooves and the other end connected with the shoulder auxiliary groove, and the plurality of lateral grooves are connected to the first groove portion and are not connected to the second groove portion, wherein a ratio of an area of the center land portion to a total area of the center land portion and each of the pair of shoulder land portions within a ground contact area is 30% or more and 35% or less, and a ratio of an area of each of the pair of shoulder land portions to the total area is 30% or more and 35% or less.

2. The pneumatic tire according to claim 1, wherein
an angle of a groove center line of any of the two main grooves with respect to the tire circumferential direction is larger than an angle of a groove center line of the center auxiliary groove with respect to the tire circumferential direction, and an angle of a groove center line of the shoulder auxiliary groove with respect to the tire circumferential direction is larger than the angle of the groove center line of any of the two main grooves with respect to the tire circumferential direction.

3. The pneumatic tire according to claim 1, wherein
an angle of a groove center line of each of the lateral grooves with respect to the tire circumferential direction increases toward an outside in the tire width direction.

4. The pneumatic tire according to claim 1, wherein
the shoulder auxiliary groove is provided on a ground contact end side from a center of each of the pair of shoulder land portions in the tire width direction.

5. The pneumatic tire according to claim 1, wherein
the shoulder auxiliary groove is provided with a plurality of dimples in the tire circumferential direction.

6. The pneumatic tire according to claim 1, wherein
the center auxiliary groove has a groove width of 50% or less of that of one of the main grooves and a groove depth of 60% or less of that of one of the main grooves.

7. The pneumatic tire according to claim 1, wherein
the second groove portion has a dimple that widens the groove width of the second groove portion and is shallower than the second groove portion.

8. The pneumatic tire according to claim 1, wherein
no sipes are provided in the center land portion.

9. The pneumatic tire according to claim 1, wherein
a plurality of third lateral grooves is provided on one shoulder land portion of the pair of shoulder land portions, one of the pluralities of third lateral grooves extends from the ground contact end toward the shoulder auxiliary groove in the tire width direction and terminates in an outer shoulder land portion without communicating with the shoulder auxiliary groove; and an inner end portion of the third lateral groove in the tire width direction is provided so as to face the second groove portion of the shoulder auxiliary groove in the tire width direction.

10. The pneumatic tire according to claim 1, wherein
one of the two main grooves includes a groove wall, and the second groove portion extends parallel to the groove wall.

11. The pneumatic tire according to claim 1, wherein
a pair of outer shoulder land sections are provided with a plurality of first lateral grooves, second lateral grooves, and third lateral grooves extending in the tire width direction at intervals in the tire circumferential direction, the plurality of first lateral grooves are connected to the first groove portion, and each of the plurality of second lateral grooves is provided so as to face each of the plurality of first lateral grooves with the shoulder auxiliary groove interposed therebetween, wherein the plurality of third lateral grooves extend in the width direction of the tire and terminate within the shoulder land portion.

12. A pneumatic tire comprising:
two main grooves provided on a tread and extending in a tire circumferential direction;

a center land portion partitioned by the two main grooves and continuously extending in the tire circumferential direction;

a pair of shoulder land portions positioned outside of the two main grooves in a tire width direction, the shoulder land portions extending in the tire circumferential direction;

a center auxiliary groove provided on the center land portion and extending in the tire circumferential direction; and a shoulder auxiliary groove provided on at least one shoulder land portion and extending continuously in the tire circumferential direction, wherein the center auxiliary groove is narrower than any of the two main grooves and shallower than any of the two main grooves, and the shoulder auxiliary groove is narrower than any of the two main grooves and shallower than any of the two main grooves, wherein the shoulder auxiliary groove has a first groove portion inclined and extending in the tire circumferential direction and a second groove portion inclined and extending in a direction opposite to the first groove portion in the tire circumferential direction and is shorter than the first groove portion, the shoulder auxiliary groove portion has a zigzag shape formed by alternately connecting the first groove portion and the second groove portion, the center land portion includes a rib-shaped land portion continuous in the tire circumferential direction, the pair of shoulder land portions includes a plurality of lateral grooves provided at intervals in the tire circumferential direction and having one end connected with one of the main grooves and the other end connected with the shoulder auxiliary groove, and the plurality of lateral grooves are connected to the first groove portion and are not connected to the second groove portion, wherein a plurality of third lateral grooves is provided on one shoulder land portion of the pair of shoulder land portions, one of the pluralities of third lateral grooves extends from the ground contact end toward the shoulder auxiliary groove in the tire width direction and terminates in an outer shoulder land portion without communicating with the shoulder auxiliary groove; and an inner end portion of the third lateral groove in the tire width direction is provided so as to face the second groove portion of the shoulder auxiliary groove in the tire width direction.

13. The pneumatic tire according to claim 12, wherein an angle of a groove center line of any of the two main grooves with respect to the tire circumferential direction is larger than an angle of a groove center line of the center auxiliary groove with respect to the tire circumferential direction, and an angle of a groove center line of the shoulder auxiliary groove with respect to the tire circumferential direction is larger than the angle of the groove center line of any of the two main grooves with respect to the tire circumferential direction.

14. The pneumatic tire according to claim 12, wherein an angle of a groove center line of each of the lateral grooves with respect to the tire circumferential direction increases toward an outside in the tire width direction.

15. The pneumatic tire according to claim 12, wherein the shoulder auxiliary groove is provided on a ground contact end side from a center of each of the pair of shoulder land portions in the tire width direction.

16. The pneumatic tire according to claim 12, wherein the shoulder auxiliary groove is provided with a plurality of dimples in the tire circumferential direction.

17. The pneumatic tire according to claim 12, wherein the center auxiliary groove has a groove width of 50% or less of that of one of the main grooves and a groove depth of 60% or less of that of one of the main grooves.

18. The pneumatic tire according to claim 12, wherein the second groove portion has a dimple that widens the groove width of the second groove portion and is shallower than the second groove portion.

19. The pneumatic tire according to claim 12, wherein no sipes are provided in the center land portion.

20. The pneumatic tire according to claim 12, wherein one of the two main grooves includes a groove wall, and the second groove portion extends parallel to the groove wall.

21. The pneumatic tire according to claim 12, wherein a pair of outer shoulder land sections are provided with a plurality of first lateral grooves, second lateral grooves, and third lateral grooves extending in the tire width direction at intervals in the tire circumferential direction, the plurality of first lateral grooves are connected to the first groove portion, and each of the plurality of second lateral grooves is provided so as to face each of the plurality of first lateral grooves with the shoulder auxiliary groove interposed therebetween, wherein the plurality of third lateral grooves extend in the width direction of the tire and terminate within the shoulder land portion.

* * * * *